United States Patent [19]

Miranker

[11] Patent Number: 4,969,117
[45] Date of Patent: Nov. 6, 1990

[54] CHAINING AND HAZARD APPARATUS AND METHOD

[75] Inventor: Glen S. Miranker, San Francisco, Calif.

[73] Assignee: Ardent Computer Corporation, Sunnyvale, Calif.

[21] Appl. No.: 348,033

[22] Filed: May 5, 1989

Related U.S. Application Data

[63] Continuation-in-part of Ser. No. 194,458, May 16, 1988, Pat. No. 4,935,849.

[51] Int. Cl.[5] .............................................. G06F 11/28
[52] U.S. Cl. ................................... 364/730; 364/736; 364/200; 371/69.1
[58] Field of Search ............... 364/736, 730, 740, 741, 364/737, 200, 900; 371/69.1

[56] References Cited

U.S. PATENT DOCUMENTS

| 4,339,808 | 3/1980 | North | 364/900 |
|---|---|---|---|
| 4,532,589 | 12/1982 | Shintani et al. | 364/200 |
| 4,594,655 | 3/1983 | Hao et al. | 364/736 X |
| 4,768,148 | 6/1986 | Keeley et al. | 364/200 |
| 4,777,592 | 6/1986 | Yano | 364/736 X |
| 4,777,593 | 12/1984 | Yoshida | 364/736 X |
| 4,789,925 | 7/1985 | Lahti | 364/730 X |

FOREIGN PATENT DOCUMENTS

| 0121700 | 2/1984 | European Pat. Off. |
| 1397310 | 7/1972 | United Kingdom |
| 1570510 | 12/1976 | United Kingdom |
| 1582815 | 2/1978 | United Kingdom |
| 2113878 | 12/1982 | United Kingdom |
| 2159309 | 12/1982 | United Kingdom |
| 2153558 | 12/1984 | United Kingdom |

Primary Examiner—Jerry Smith
Assistant Examiner—Robert W. Beausoliel
Attorney, Agent, or Firm—Blakely, Sokoloff, Taylor & Zafman

[57] ABSTRACT

An apparatus and method for detecting data conflicts in a multiple processor computer system and for throttling processing of instructions in individual pipelines where data conflicts exist. The present invention comprises circuitry for detecting data conflict problems in a computer system. The circuit of the present invention comprises a plurality of registers associated with each processor in the system. The registers are used to store a range of elements to be written by the associated processor and a plurality of ranges of elements to be read by the associated processor. These ranges are then compared against data accesses by other processors in the computer system and where a data conflict exists, a circuit is provided for determining which processor will be allowed to continue processing and which processor will be prevented from continuing processing. The circuitry ensures the processor completes processing of instructions in a logical manner giving expected results while allowing maximal element level overlap.

6 Claims, 4 Drawing Sheets

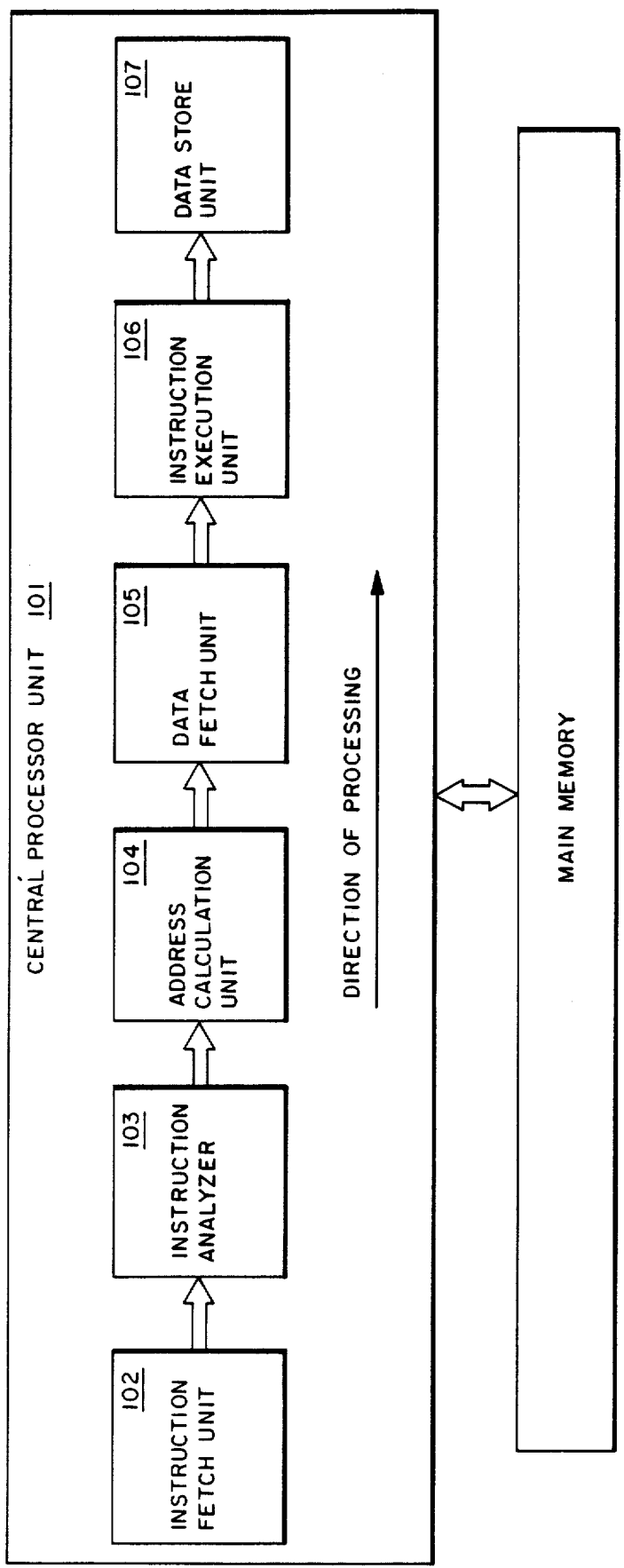
FIG_1 (PRIOR ART)

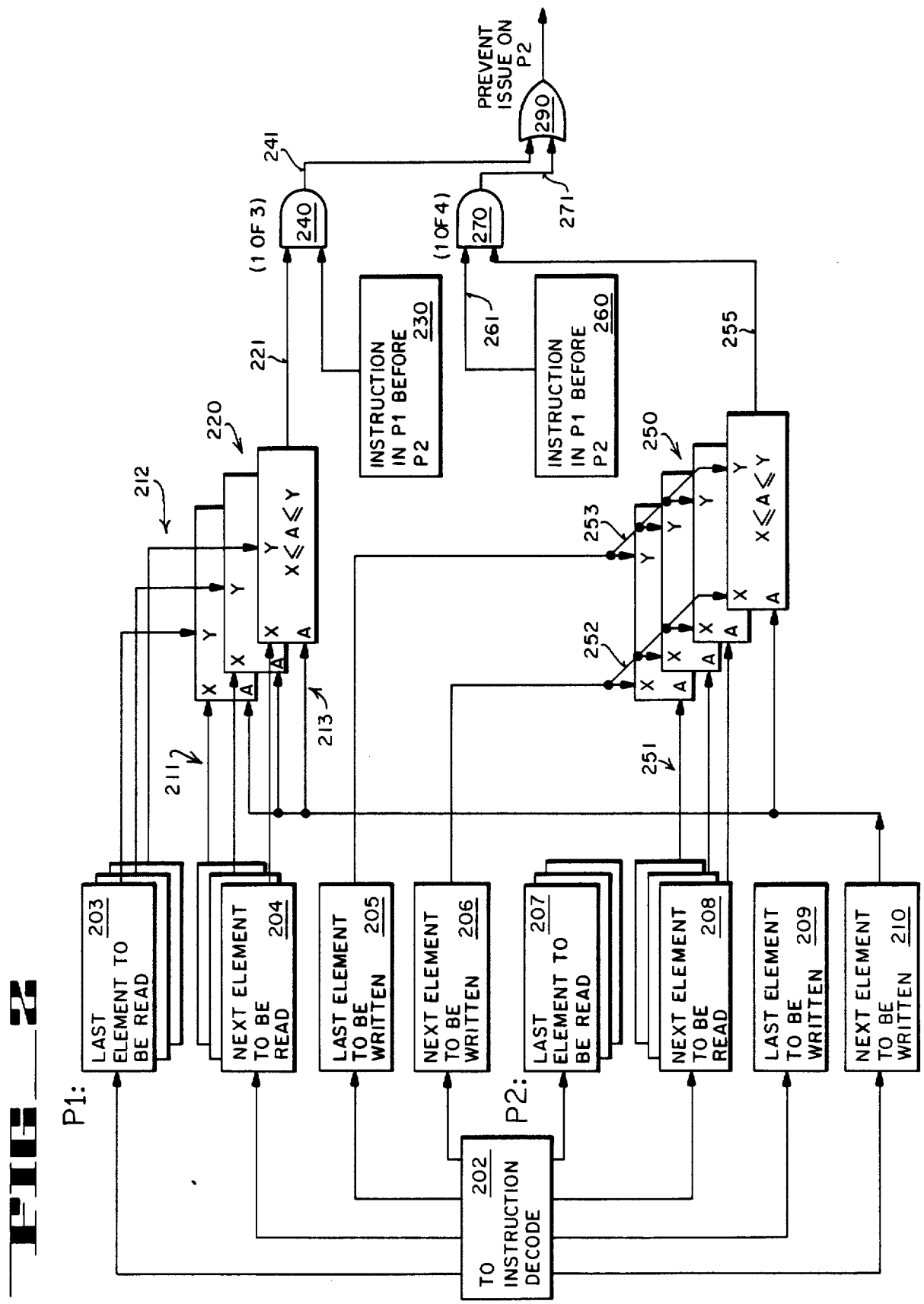

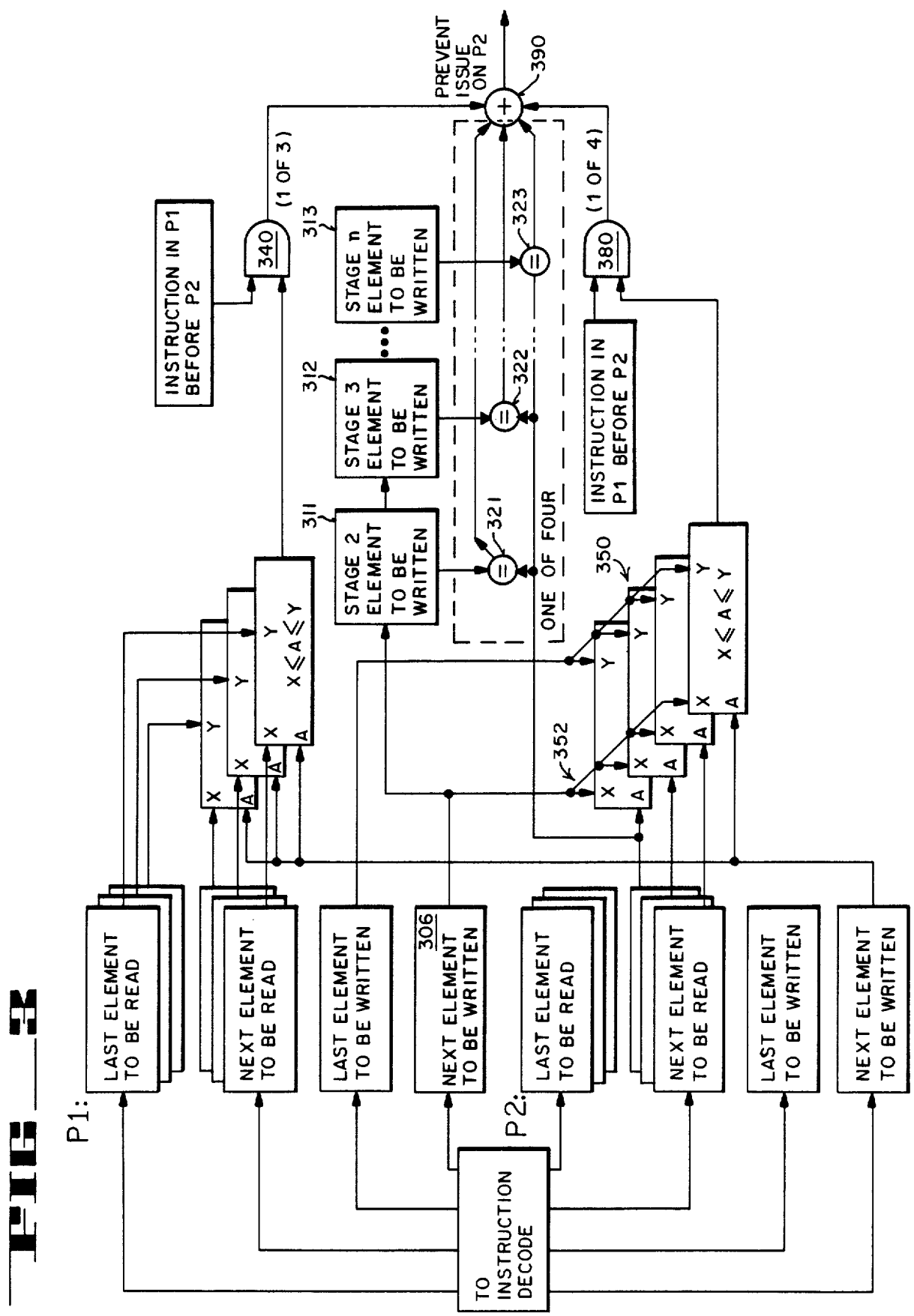

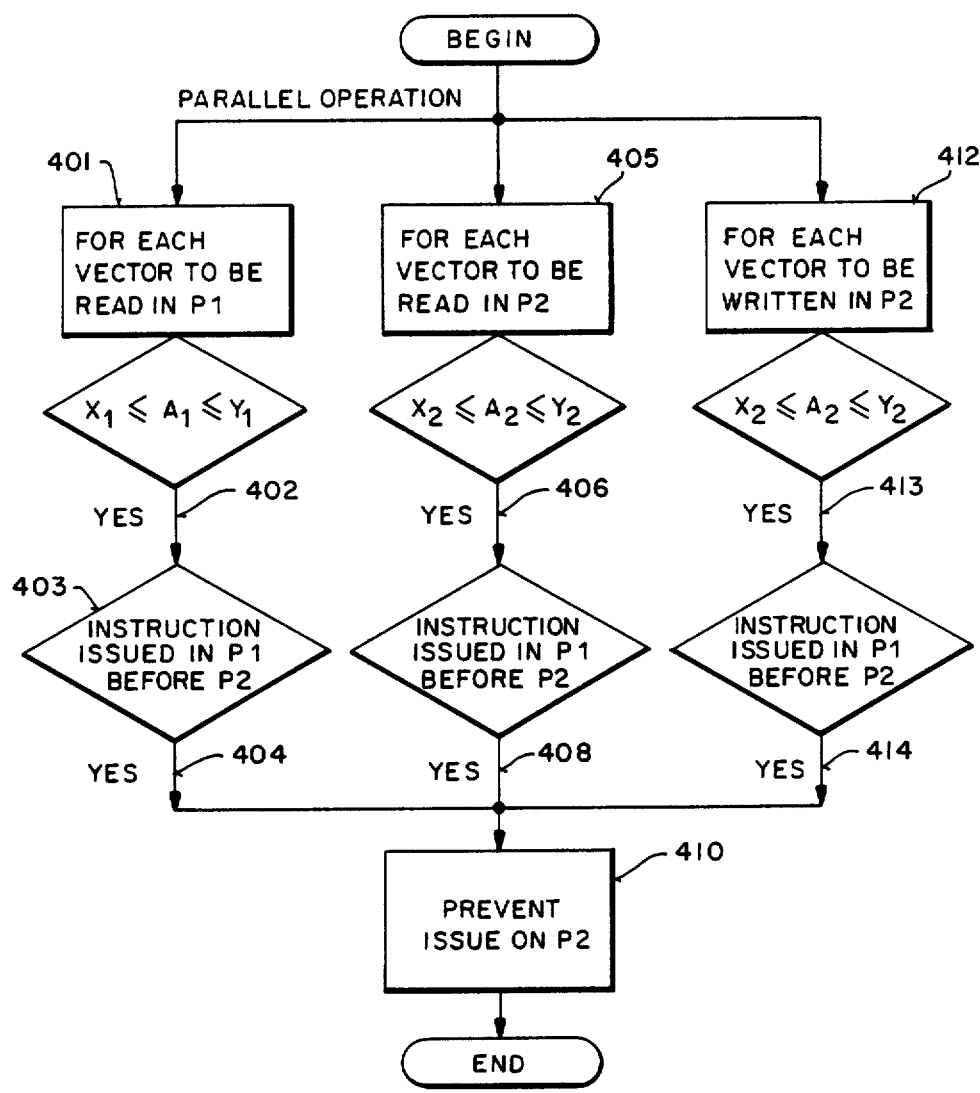
FIG_4
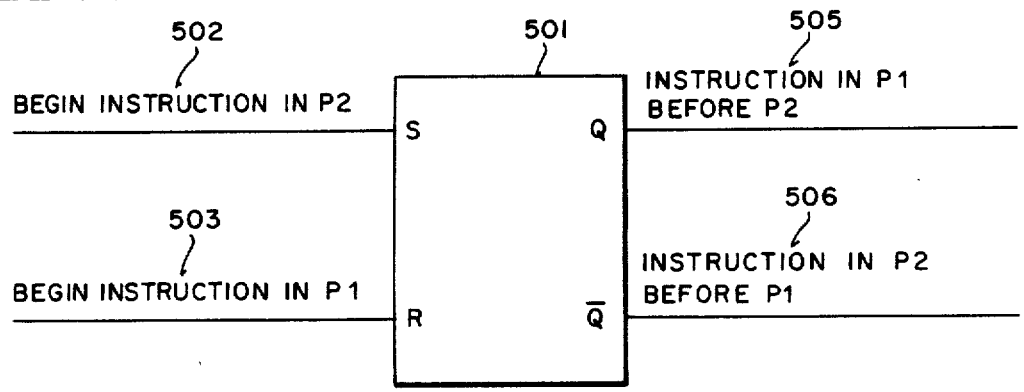
FIG_5

CHAINING AND HAZARD APPARATUS AND METHOD

BACKGROUND OF THE PRESENT INVENTION

This is a continuation-in-part of application Ser. No. 194,458 filed May 16, 1988, now U.S. Pat. No. 4,935,849, issued June 19, 1990 entitled "Chaining and Hazard Apparatus and Method" assigned to the assignee of the present invention.

1. Field of the Invention.

The present invention relates to the field of concurrent processing of operations in a computer system with specific application to vector processing computer systems.

2. Prior Art.

In many known computer systems, multiple processors are utilized to process instructions. In such systems, it is often desired to process instructions from a single process in parallel or concurrently. For example, it may be desired to process an instruction sequence such as:

LOAD R5, memory

ADD R3, R2, R1 on two separate processors, the first processor loading register 5 from memory and the second processor adding the contents of register 3 and register 2, giving register 1 as a result.

Parallel or concurrent processing of instructions is relatively simple when the instructions do not share common data. Such instructions may be said to be disjoint or independent.

However, it may be desired to process an instruction sequence such as:

LOAD R1, memory

ADD R3, R2, R1 on two separate processors. In such an instruction sequence, the contents of register 1 after processing of the instructions may depend on the relative speed of processing the two instructions if the instructions are processed concurrently.

For example, consider two concurrent instructions issued at $clock_n$ and $clock_{n+k}$ ($k>0$), both referencing a common cell A. If the first instruction produces a result needed by the second instruction, then the second instruction is said to have a chain dependency on the first. In such a case, the processing of the second instruction must be delayed until the first instruction completes its write of A. The completion of writing A may be termed "clearing" the conflict.

If both instructions write A, then a data "hazard" exists and the instructions must complete in the order issued. If the first instruction reads location A and the second instruction writes to location A, then a data "hazard" also exists and the actions must proceed in time such that the read of A by the first instruction proceeds the write of A by the second instruction. These data conflicts are summarized in Table I below:

TABLE I

| CHAINING AND HAZARD DEFINITION | | |
|---|---|---|
| FIRST ACTION | LATER ACTION | |
| | READ A | WRITE A |
| READ A | NO CONFLICT | DATA HAZARD |
| WRITE A | CHAINING CONFLICT | DATA HAZARD |

A number of methods and apparatus for solving such a concurrency problem are known in the art. For example, some programming languages allow for the programmer to code instructions to avoid data conflict problems posed by concurrent processing of instructions. An example of such a programming language is Concurrent SP k (CSP k), which is the SP k subset of PL I, extended with concurrency constructs. In CSP k, the constructs are called monitors and are implemented around critical pieces of code. An example of CSP k compiler that runs on an IBM system 360/370 was developed by the University of Toronto, Toronto, Ontario, Canada.

A number of other methods including use of specialized circuitry and hardware and software semaphores are known for implementing concurrent and parallel processings of instructions.

Processing of concurrent instructions is further complicated in a computer system having multiple processors in which the processor organization is a pipeline machine. With reference to FIG. 1, pipeline machines generally comprise one or more central processor units 101 having a plurality of separate units to process each step of an instruction. For example, an instruction fetch unit 102 may fetch an instruction to be processed. An instruction analyzer unit 103 may decode the fetched instruction and the instruction fetch unit 102 may fetch a second instruction. An address calculation unit 104 determines if the initial instruction needs data from memory and the address of such data while the instruction analyzer 103 is decoding the second instruction and the instruction fetch unit is fetching a third instruction. A data fetch unit 105 may then fetch data from memory for the first instruction and an instruction processing unit 106 will subsequently process the instruction. A data store unit 107 may then store a result in memory. Each instruction follows through each step down the pipeline.

In a computer system utilizing pipeline machines and concurrent or parallel processing it is important to examine data affected by each stage of the pipeline when determining if data conflicts exist.

Therefore, it is desired to develop a method and apparatus for determining whether data conflicts exist and for throttling processing of instructions where such conflicts exist in a computer system utilizing concurrent and parallel processing.

It is further desired to develop a method and apparatus for detecting data conflicts and for throttling processing of instructions where data conflicts exist in a computer system utilizing a plurality of processors having a pipeline architecture.

It is further desired to develop a method and apparatus for detecting data conflicts and for throttling processing of instruction in a vector processing computer system whereby the result of sequential processing of instructions is maintained which allowing maximum overlap of processing at the vector element level.

It is further desired to develop such a method and apparatus having application in computer systems having any number of pipelines and processors.

It is further desired to develop such a method and apparatus having application in computer systems having pipelines of arbitrary length and in which read and write operations may occur at any stage of a pipeline.

It is further desired to develop such a method and apparatus whereby the order of issuance of an arbitrary number of instructions may be determined utilizing pairwise ordering bits.

SUMMARY OF THE PRESENT INVENTION

The present invention relates to an apparatus for detecting data conflicts in a computer system and for throttling processing of instructions where data conflicts exist, such that the processing of instructions may have maximum overlap while yielding identical results to sequential processing of the instructions.

The present invention comprises a circuit in which each pipeline stage reading data is compared against all pipeline stages writing data to determine whether data conflicts exist. Further each pipeline stage writing data is compared against all pipeline stages writing data and all pipelines reading data to determine whether data conflicts exist. The present invention discloses circuitry for comparing the interval of data which is to be accessed by a pipeline against intervals of data to be accessed by other pipelines and circuitry for comparing a single element to be accessed in a pipeline against a single element of data in other pipelines. The comparators of the present invention for comparing against a single element of data are especially useful where an element to be written has advanced into the pipeline and is currently being processed by one of the stages of the pipeline.

The present invention further discloses circuitry for determining the ordering sequence of instructions. This circuitry is utilized when it is determined that a data conflict exists, to determined which pipeline is allowed to continue processing and which pipeline will be throttled or be prevented from processing.

The present invention discloses circuitry allowing data conflicts to be detected and xecution of instructions entering a pipeline to be delayed at precisely the stage of the pipeline necessary to ensure the results of processing all instructions yields a result identical to the result of sequential processing of those instructions.

BRIEF DESCRIPTION OF THE DRAWINGS

FIG. 1 is a block diagram illustrating a known pipeline architecture.

FIG. 2 is a block diagram illustrating a circuit as may be utilized by the present invention for detecting data conflicts.

FIG. 3 is a block diagram illustrating the circuit of FIG. 2, including further circuitry as may be utilized in a pipeline architecture.

FIG. 4 is a flowchart illustrating a method for detecting data conflicts as may be utilized by the present invention.

FIG. 5 is a circuit diagram illustrating a circuit as may be utilized in the present invention for determining the sequence of instructions.

DETAILED DESCRIPTION OF THE PRESENT INVENTION

A method and apparatus for detecting data conflicts in a computer system is described. In the following description, numerous specific details are set forth such as specific circuit types, etc., in order to provide a thorough understanding of the present invention. It will be obvious, however, to one skilled in the art that the present invention may be practiced without these specific details. In other instances, well-known circuits and structures have not been shown in detail in order not to unnecessarily obscure the present invention.

OVERVIEW OF THE PRESENT INVENTION

The present invention discloses a method and apparatus for detection of data conflicts, particulary chaining and hazard conflicts, in a multiprocessor computer system. The present invention has particular application in computer systems utilizing multiple processors with a pipeline architecture. The present invention further has particular application in a vector processing computer system.

Typically, data conflicts arise in a multiple processor computer systems when two or more processors processing concurrent code attempt to access a common data cell. For example, a first processor may process a first instruction which produces a result A. The result A may be required by a second instruction which is being processed concurrently on a second processor. In such a case, the second instruction is said to have a chain dependency on the first instruction. (TABLE I, in the BACKGROUND OF THE INVENTION section illustrates various data conflicts including chain dependencies.)

By way of example, with reference to Table II, if instruction 1 (a=b+c) is processed on a first processor and instruction 2 (d=a+e) is processed on a second processor, a chain dependency is said to exist. Instruction 1 computes A which is required by instruction 2. Therefore, the processing of instruction 2 must be delayed until instruction 1 completes its write of A.

Two types of data hazards are possible as illustrated by Table I. A first type of data hazard is said to exist where two instructions attempt to update a common data cell. For example, if instruction 3 (a=f+g) is processed on a first processor and instruction 4 (a=g+h) is processed on a second processor, the processing of instruction 4 must be delayed until instruction 3 completes its update of data cell A.

A second type of data hazard occurs where a first instruction reads a data cell that a second instruction attempts to update. This second type of data hazard is illustrated with reference to instructions 5 and 6. If instruction 5 (h=a+2) is processed on a first processor and instruction 6 (a=a−1) is processed on a second processor, the processing of instruction 6 must be delayed until completion of a read of data cell A by the processor processing instruction 5.

TABLE II

A=B+C←INSTRUCTION 1

D=A+E←INSTRUCTION 2

A=F+G←INSTRUCTION 3

A=G+H←INSTRUCTION 4

H=A+2 ←INSTRUCTION 5

A=A−1 ←INSTRUCTION 6

The preferred embodiment of the present invention comprises a vector processing computer system in which an instruction may access a vector at a time when doing computations. Further, the computer system of the preferred embodiment allows for cell level addressibility of vectors in the system.

The computer system of the present invention is further disclosed in United States Patent Application Ser. No. 162,738, Filed Mar. 1, 1988, entitled "Vector Register File", assigned to the assignee of the present invention and is incorporated here by reference.

The present invention detects data conflicts, including chain dependencies and both types of data hazards, and controls processing of instructions such that the results achieved are the same as if the instructions were processed in a non-overlapped fashion. The preferred embodiment of the present invention detects such data conflicts in a vector processing computer system utilizing a plurality of pipes which may effect data. Further, the preferred embodiment of the present invention will detect data conflicts in a computer system which allows for cell level addressability of a vector register.

Referring now to FIG. 2, a block diagram of a circuit as may be utilized by the present invention is disclosed.

The circuitry of FIG. 2 illustrates an embodiment of the present invention in which all reads and all writes take place in the first stage of a pipeline in a computer system utilizing a pipelined architecture. As will be seen with reference to the example of FIG. 3, alternative embodiments allow for implementation in systems allowing for reads and/or writes at other stages of the pipeline.

Instruction decode circuitry 202 loads the address of the last element of each vector to be read by a first processor into a first plurality of registers 203 and loads the address of the next element of each vector to be read by the first processor into a second plurality of registers 204. The decode circuitry 202 loads the address of the last element of a vector to be written into a third register 205 and the address of the next element of the vector to be written into a fourth register 206.

The description below specifically describes an embodiment having three or fewer inputs and one output. It will be obvious to one of ordinary skill in the art that other embodiments may be constructed utilizing the inventive aspects of the present invention.

For example, if an instruction such as:

ADD VR1, VR2, VR3 is processed on the first processor, indicating vector register 1 is to be added to vector register 2 yielding a result vector register 3, the instruction decode circuitry 202 initiates the following action:

(1) The vector register file element of the last element in VR1 is loaded into one of the last elements to be read registers 203;

(2) The vector register file element of the first element of VR1 is loaded into one of the next element to be read registers 204. The particular register is chosen to correspond to the last element to be read register 203 holding the vector register file element of the last element of VR1;

(3) The vector register file element of the last element of VR2 is loaded into a second of the last element to be read registers 203;

(4) The vector register file element of the first element of VR2 is loaded into a second of the next element to be read registers 204. The particular register is chosen to correspond to the last element to be read register 203 holding the vector register file element of the last element of VR2;

(5) The vector register file element of the last element of VR3 is loaded into the last element to be written register 205 and the vector register file element of the first element of VR3 is loaded into the next element to be written register 206.

Registers 207, 208, 209 and 210 are loaded similarly for a second processor processing a second instruction. The second instruction may logically follow the first instruction in a process.

The circuitry disclosed by FIG. 2 yields as an output a stall signal 290 for preventing issue of an instruction in the second processor.

DATA HAZARD (READ FOLLOWED BY WRITE)

As described in more detail with reference to FIG. 4, comparator circuits 220 determine, for each vector to be read by the first processor, whether the next element to be written by the second processor falls in a range of addresses bounded by the next element to be read of the vector and the last element to be read of the vector, block 401. In block 401, $X_1$ refers to the next element of the vector to be read by processor $P_1$; $Y_1$ refers to the last element of the vector to be read by processor $P_1$; and $A_1$ refers to the next element of the vector to be written by processor $P_2$. The comparison of $A_1$ with a range of values bounded by $X_1$ and $Y_1$ is done for each vector being processed by processor P1.

If the address of the next element of the vector to be written ($A_1$) falls within the any of the ranges bounded by the next element to be read ($X_1$) of any vector and last element to be read ($Y_1$) of that vector, branch 402, it is determined whether the instruction in processor 1 was issued before the instruction in processor 2, block 403.

If the instruction did issue in processor 1 before issuing in processor 2, branch 404, the instruction on processor 2 is not allowed to continue processing during the current clock cycle, block 410.

This branch of FIG. 4, thus, checks for the above-described read followed by write data conflict.

CHAINING CONFLICTS (WRITE FOLLOWED BY READ)

Similarly, in parallel with the operation described above for comparator circuits 220, comparator circuits 250 determines for each vector either to be read or written by the second processor, whether the next element to be read or written by the second processor ($A_2$) falls in a range of addresses bounded by the next element to be written by the first processor ($X_2$) and the last element to be written by the first processor ($Y_2$), block 405.

If it does, branch 406, a comparison is done to determine if the current instruction in the first processor was issued before the current instruction in the second processor, block 407. If so, branch 408, the instruction on processor 2 is prevented from continuing processing during the current clock cycle, block 410.

This branch of FIG. 4, thus, checks for the above-described chaining conflicts.

DATA HAZARD (WRITE FOLLOWED BY WRITE)

FIG. 4 further logically illustrates detection of data hazards in which both processor 1 and processor 2 attempt to write to a single location. For each vector to be written by processor 2, a comparison is done of the address of the element to be written by processor 2 ($A_2$) and the range of addresses bounded by the next element to be written by processor 1 ($X_1$) and the last element to be written by processor 1 ($Y_2$), block 412. If the element to be written by processor 2 falls within this range, branch 413, a comparison is done to determine if the instruction in processor 1 issued before the instruction in processor 2. If so, branch 414, the write instruction in processor 2 is prevented from continuing (throttled) until the next processing cycle.

CIRCUITRY FOR DETECTION OF HAZARDS AND CONFLICTS

Referring again to FIG. 2, circuity implementing the process of FIG. 4 will be described. The next element to be read of each vector in processor 1, stored in registers 204, is applied to a X-input 211 of comparator circuits 220. The last element of each vector register to be read, stored in registers 203, is applied to the Y-input 212 of comparator circuits 220. The next element to be read and the last element to be read of each of the other vectors being read by processor 1 are applied to corresponding X and Y-inputs of comparator circuits 220. The next element to be written by the second processor, stored in register 210, is applied to the A-input 213 of comparator circuits 220.

Comparator circuits 220 compares each X and Y-input to determine if the address on the A-input is less than or equal to the address on the Y-input and whether the address on the X-input is less than or equal to the address on the A-input.

If the A-input falls within the interval of addresses bounded by the X-input and the Y-input of any of the vector registers read by processor 1, the output signal 221 of the corresponding comparator circuit 220 is brought high.

In the preferred embodiment, signal line 221 and gate 240 are duplicated for each of the vector registers read by processor 1. Thus, in the preferred embodiment, line 221 and gate 240, although illustrated in FIG. 2 as a single circuit, actually comprises three AND gates having inputs from each of the three comparator circuits shown.

Circuit 230 provides a signal on line 231 indicating whether the instruction processing on processor 1 or the instruction processing on processor 2 was logically issued first. A high signal is provided if the instruction in processor 1 was issued first and a low signal is provided if the instruction in processor 2 was issued first. (Circuit 230 provides input to each of the above-mentioned AND gates 240.)

Referring briefly to FIG. 5, the circuitry utilized by the preferred embodiment for determining logical instruction sequence is illustrated.

As one key aspect of the present invention, the order of processing of any number of instruction may be determined and controlled by circuitry which tracks the order of issuance of pairs of instructions. The present invention offers the inventive advantage of not requiring an overall ordered list of the order of issuance of instructions in the system. The preferred embodiment of the present invention utilizes an S-R flip-flop 501, as exemplified by FIG. 5, for such pairwise ordering. The S-R flip-flop 501 has as an input to the set (S) input 502 of the flip-flop a signal indicating an instruction is issued in processor 2. The input to the reset (R) input 503 is a signal indicating an instruction is issued in processor 1. As a result, the output 505 is high when an instruction was issued in processor 1 before the instruction in processor 2 was issued. The $\overline{Q}$ output 506 is high when the instruction in processor 2 was issued before the instruction in processor 1 was issued. Therefore, in the block diagram of FIG. 2, the Q output 505 of the S-R flip-flop 501 is utilized as the output signal 231 from circuit 230.

The output signal 231 of circuit 230 and the output signal 221 of circuits 220 are utilized as inputs to AND gate 240. The output of AND gate 240 on line 241 is used as an input to seven input OR gate 290. (Note, that as described above, the preferred embodiment actually comprises three AND gates providing three inputs of the inputs into seven input OR gate 290.)

Utilizing the described circuitry, it may be determined whether an instruction which writes an element by processor 2 should be prevented from issuing during the current clock cycle.

Utilizing similar circuitry, elements to be read by processor 2 are examined and it is determined whether to prevent issue of an instruction which reads such elements.

The next element to be read in each vector of processor 2 is stored in registers 208. The contents of these registers are applied to the A-inputs 251 of comparator circuits 250. (In addition, the next element to be written by processor 2 is stored in register 210. The value is applied to one of the comparators 250 for determining data hazard conflicts. This will be discussed in more detail below.)

The next element to be written by processor 1 is stored in register 206 and is applied to each of the X-inputs 252 of comparator circuits 250. The last element to be written by processor 1 is stored in register 205 and is applied to the Y-inputs of comparator circuits 250. A comparison is then done to determine whether the next element to be read of any of the vector registers to be read by processor 2 (A-input) falls in the range of addresses bounded by the next element to be written by processor 1 (X-input) and the last element to be written by processor 1 (Y-input).

If any of the A-inputs 251 falls in the range bounded by the X-input and the Y-input, the output signal 255 of the corresponding comparator circuit 250 is brought high.

Similar to the description of signal 221 and gate 240 above, in the preferred embodiment, a separate comparator 250 exists for each vector to be read by processor 2, although FIG. 2 illustrates these comparators as a group having a single output. In practice, each of these comparators has an output signal 255 used as input to separate AND gates 270. The preferred embodiment comprises four AND gates 270 coupled to each of the four comparators 250. Each of the four AND gates 270 has an output 271 coupled to seven input OR gate 290.

Circuit 260 provides a signal on line 261 indicating whether the instruction processing on processor 1 or the instruction processing on processor 2 is logically issued first. Circuit 260 utilizes the same circuitry as circuit 230 described in detail in connection with FIG.

5. Line 261 utilizes the Q output 505 of the S-R flip-flop 501. Lines 255 and 261 are used as inputs to each of the AND gates 270.

The output signal 271 of each of the AND gates 270 will be high if any of the addresses of elements to be read by processor 2 fall within the range of elements to be written by processor 1 and the instruction processing in processor 1 was issued before the instruction processing in processor 2.

Lines 241 and lines 271 are used as inputs to seven input OR gate 290. Utilizing the described circuitry, it is determined whether a data contention problem exists with either writing of data by processor 2 or reading of data by processor 2.

The disclosed circuitry further detects data hazards resulting from processor 2 attempting to write data to the same location as processor 1, where the instruction processing in processor 1 occurs logically before the instruction processing in processor 2. In such a situation, the desired result is to stall processing in processor 2 until completion of processing in processor 1.

The preferred embodiment of the present invention accomplishes providing for such ordering of instructions with one of comparator circuits 250 (the comparator circuit 250 coupled to receive the next element to be written from register 210 as its A input). The comparator circuit 250 is further coupled to the next element to be written register 206 of processor 1 as a second input X and the last element to be written register 205 of processor 1 as a third input Y.

The comparator circuit 250 compares input A to a range of addresses bounded by input X and input Y (i.e. is X less than or equal to A and is A less than or equal to Y). If comparator circuit 250 determines that input A (the address of the next element to be written by processor 2) is within the range of addesses bounded by input X and input Y, corresponding output signal 255 is driven high. The output signal 255 is coupled as one input to one of the AND gates 270. The AND gate 270 further has as a second input a signal 261, as described above, indicating whether the instruction processing in processor 1 was issued before the instruction in processor 2 was issued. If this signal 261 is high, indicating the instruction processing in processor 1 was issued before the instruction in processor 2 was issued, and if the corresponding signal 255 is high, the output 271 of AND gate 270 will be high. The output 271 of AND gate 270 is coupled to as one input to seven input OR gate 290.

If the output 271 of the AND gate 270 is high indicating a data hazard exists, the OR gate 290 will be high, preventing issue of the instruction in processor 2.

A symmetrical circuit produces a signal for preventing issue of an instruction on the first processor. Further, the circuitry of FIG. 2 and its symmetrical pair are duplicated for each pair of processors in the computer system of the preferred embodiment. Thus, in a computer system utilizing four processors six pairs of symmetrical circuitry occur. If the processors are labeled A through D, then the following parings may exist: AB and BA, AC and CA, AD and DA, BC and CB, BD and DB, CD and DC. In general, a computer system having N processors will have ) pairs of symmetrical comparator circuits or a total of $2 \times ()$ comparator circuits.

ALTERNATE EMBODIMENT FOR PIPELINED ARCHITECTURE

Referring to FIG. 3, the block diagram of FIG. 2 is again illustrated further showing circuitry for use in a pipelined computer system. In such a system, when processor 1 writes an element, the write may take place after the instruction has passed through several stages of the pipeline. (Note that, in the preferred embodiment, reads always take place in the first stage of the pipeline.) The address of the element to be written stored in the next element to be written register 306 is applied to a register 311 corresponding to stage 2 of the pipeline at the same time it is applied to the X-inputs 352 of the comparator circuit 350.

The present invention discloses the use of a plurality of registers such as registers 311, 312 and corresponding to each of the stages of the pipeline. The address stored in each of these stages corresponds to the address of the element being processed by that stage of the processor. The registers 311, 312 and 313 may comprise a shift register or similar apparatus, the shift register having a number of stages equal to 1 less than the number of stages in the pipeline. In the preferred embodiment, addresses in the shift registers are shifted one position during each processing cycle of the pipelined system. The contents of each of these registers are compared to the address of the next element to be read by processor 2 by comparator circuits such as comparator circuits 321, 322 and 323. The output of each of these comparator circuits 321, 322 and 323 is high if the next element to be read by processor 2 is equal to the element currently being processed by the respective stages of the pipeline and is low if they are not equal. The output of these comparator circuits 321, 322 and 323 are used as inputs to the OR gate 390 in addition to the outputs of AND gate 340 and AND gate 380 which are generated as described in connection with FIG. 2. If any of the input signals to OR gate 390 is high the instruction is prevented from issuing on processor 2. Utilizing this circuitry, data contention problems are prevented in a pipelined computer architecture.

Thus, an apparatus and method for detecting and preventing data contention problems in a computer system is described.

I claim:

1. A circuit for detecting data conflicts in a computer system, said circuit comprising:
   a first storing means for storing a first address, said first address corresponding to a beginning address in a range of addresses to be written by a first processor;
   a second storing means for storing a second address, said second address corresponding to an ending address in a range of addresses to be written by said first processor;
   a third storing means for storing a third address, said third address corresponding to an element to be written by a second processor;
   a first comparator means for comparing said first address and said second address to said third address, said first comparator means coupled with said first storing means, said second storing means and said third storing means.

2. The circuit as recited by claim 1, further comprising a means for determining order of processing of instructions in said first processor and said second processor.

3. The circuit as recited by claim 2, further comprising an AND gate, said AND gate having as inputs an output signal from said first comparator means and an output signal from said means for determining order of processing of instructions.

4. The circuit as recited by claim 3, further comprising an OR gate, said OR gate coupled with said AND gate as one input, said OR gate providing an output indicating whether processing may continue on said second processor.

5. The circuit as recited by claim 4, wherein said means for determining order of processing of instructions comprises an S-R flip-flop, said S-R flip-flop having as an S input a signal indicating processing is beginning on a new instruction in said second processor and as an R input a signal indicating processing is beginning on a new instruction in said first processor.

6. In a computer system having a first processing means for processing a first instruction and a second processing means for processing a second instruction, said first instruction causing said first processor to write a first vector, said first vector having a beginning element with an address X1 and an ending element with an address Y1, said second instruction causing said second processor to write a second element, said second element having an address A1, a method for preventing data conflicts comprising the steps of:

(a) determining if said address A1 falls in a range of addresses bounded addresses X1 and Y1;

(b) if said address A1 falls in said range of addresses, determining if said first instruction was issued prior to said second instruction being issued;

(c) if said first instruction was issued prior to said second instruction, preventing said second processor from writing said second element.

* * * * *

Disclaimer and Dedication

4,969,117—Glen S. Miranker, San Francisco, Calif. CHAINING AND HAZARD APPARATUS AND METHOD. Patent dated Nov. 6, 1990. Disclaimer filed Dec. 23, 1996, by the assignee, The Kubota Graphics Liquidating Trust.

Hereby disclaims and dedicates to the Public claims 1-6 of said patent.
*(Official Gazette, June 17, 1997)*